(12) United States Patent
Kajii et al.

(10) Patent No.: US 12,442,922 B2
(45) Date of Patent: Oct. 14, 2025

(54) OPTICAL MEASUREMENT DEVICE AND OPTICAL MEASUREMENT METHOD

(71) Applicant: OMRON Corporation, Kyoto (JP)

(72) Inventors: Yosuke Kajii, Ayabe (JP); Tomonori Kondo, Kyoto (JP)

(73) Assignee: OMRON Corporation, Kyoto (JP)

( * ) Notice: Subject to any disclaimer, the term of this patent is extended or adjusted under 35 U.S.C. 154(b) by 1154 days.

(21) Appl. No.: 17/415,738

(22) PCT Filed: Dec. 26, 2019

(86) PCT No.: PCT/JP2019/051050
§ 371 (c)(1),
(2) Date: Jun. 18, 2021

(87) PCT Pub. No.: WO2020/145172
PCT Pub. Date: Jul. 16, 2020

(65) Prior Publication Data
US 2022/0066033 A1 Mar. 3, 2022

(30) Foreign Application Priority Data

Jan. 11, 2019 (JP) ................................ 2019-003677
Sep. 19, 2019 (JP) ................................ 2019-170426

(51) Int. Cl.
*G01S 17/10* (2020.01)
*G01S 7/4863* (2020.01)
*G01S 7/487* (2006.01)

(52) U.S. Cl.
CPC ............ *G01S 17/10* (2013.01); *G01S 7/4863* (2013.01); *G01S 7/4873* (2013.01)

(58) Field of Classification Search
None
See application file for complete search history.

(56) References Cited

U.S. PATENT DOCUMENTS

| 2005/0128475 A1 | 6/2005 | Imura |
| 2006/0267756 A1 | 11/2006 | Kates |
| 2018/0210082 A1* | 7/2018 | Tanisue ................. G01S 7/4802 |

FOREIGN PATENT DOCUMENTS

| CN | 101111890 | 1/2008 |
| CN | 103764009 | 4/2014 |

(Continued)

OTHER PUBLICATIONS

"Search Report of Europe Counterpart Application", issued on Jul. 26, 2022, p. 1-p. 8.

(Continued)

*Primary Examiner* — Hovhannes Baghdasaryan
(74) *Attorney, Agent, or Firm* — JCIPRNET

(57) ABSTRACT

Without requiring that threshold values be set for each measurement condition, the present invention makes it possible to determine whether noise that can occur in measured values is present. An optical measurement device acquires measured values on the basis of the amount of reflected light that is received after being reflected by a target. The optical measurement device comprises a setting part for setting a threshold value for the amount of received reflected light per unit time on the basis of feature information regarding the light amount of the optical measurement device and a determination part for determining whether there is measured value noise on the basis of the threshold value.

10 Claims, 12 Drawing Sheets

(56) References Cited

FOREIGN PATENT DOCUMENTS

| | | |
|---|---|---|
| CN | 104914480 | 9/2015 |
| CN | 106878609 | 6/2017 |
| CN | 107228635 | 10/2017 |
| CN | 107957582 | 4/2018 |
| CN | 108345042 | 7/2018 |
| EP | 2500685 | 12/2015 |
| EP | 3222963 | 9/2017 |
| JP | 2002277207 | 9/2002 |
| JP | 2008139513 | 6/2008 |
| JP | 2010066199 | 3/2010 |
| JP | 2010096570 | 4/2010 |
| JP | 2017116509 | 6/2017 |
| JP | 2017173159 | 9/2017 |
| JP | 6238529 | 11/2017 |
| JP | 2018136123 | 8/2018 |
| JP | 2018173559 | 11/2018 |

OTHER PUBLICATIONS

"International Search Report (Form PCT/ISA/210) of PCT/JP2019/051050," mailed on Mar. 10, 2020, with English translation thereof, pp. 1-4.

"Written Opinion of the International Searching Authority (Form PCT/ISA/237) of PCT/JP2019/051050," mailed on Mar. 10, 2020, with English translation thereof, pp. 1-8.

Xu Zheng-Ping et al., "Scannerless laser active imaging validating system by directly ranging" with English Abstract, Optics and Precision Engineering, vol. 24, Feb. 2016, pp. 1-9.

Zhu Zhengtao et al., "Research and Implementation of Laser Triangulation System Based on Telecentric Lens" with English Abstract, Laser &Optoelectronics Progres, Sep. 2017, pp. 1-6.

"Office Action of China Counterpart Application" with English translation thereof, issued on May 20, 2022, p. 1-p. 19.

* cited by examiner

OPTICAL MEASUREMENT DEVICE AND OPTICAL MEASUREMENT METHOD

CROSS-REFERENCE TO RELATED APPLICATION

This application is a 371 application of the International PCT application serial no. PCT/JP2019/051050, filed on Dec. 26, 2019, which claims the priority benefits of Japan Patent Application No. 2019-003677, filed on Jan. 11, 2019, and Japan Patent Application No. 2019-170426, filed on Sep. 19, 2019. The entirety of each of the above-mentioned patent applications is hereby incorporated by reference herein and made a part of this specification.

BACKGROUND

Technical Field

The disclosure relates to an optical measurement device and an optical measurement method.

Description of Related Art

Known as this type of optical measurement device is one that includes a light reception part that receives light projected from a light projection part and outputs a signal corresponding to the received light amount, a setting part that sets a threshold value for detecting the edge (end) position of a target, and an edge extraction part that acquires the position of the intersection of the received light amount distribution acquired based on the output signal of the light reception part and the threshold value set by the setting part as an approximate edge position (see Patent Document 1). In this optical measurement device, the user sets the threshold value between the maximum level and the minimum level of the received light amount distribution while looking at a display part of a monitor device, so that the intersection position between the received light amount distribution and the threshold value is acquired as the approximate edge position.

RELATED ART

Patent Document

[Patent Document 1] Japanese Laid-Open No. 2002-277207

SUMMARY

Technical Problem

Here, when the distance from the device to the target is measured as the measured value, for example, if the target is moved, there may be a value (outlier) significantly higher than the actual distance to the end of the target. In this case, the user of the device may end up using the extremely high value (that is, the noise) occurring in the measured distance without noticing that the value is different from the actual distance.

Conventionally, in order to determine the presence or absence of noise occurring in the measured distance, a threshold value for the received light amount is set in advance, and the presence or absence of noise in the measured distance is determined based on the threshold value.

However, the received light amount of the reflected light varies greatly due to measurement conditions such as the exposure time of the device and the moving speed when the device or the target moves, in addition to the type of the target. Therefore, in the conventional method, it is necessary to set a threshold value for each measurement condition that influences the received light amount.

Therefore, the disclosure provides an optical measurement device and an optical measurement method capable of determining the presence or absence of noise that may occur in a measured value without setting a threshold value for each measurement condition.

Solution to the Problem

An optical measurement device according to an aspect of the disclosure is an optical measurement device that acquires a measured value based on a received light amount of reflected light reflected by a target, and the optical measurement device includes: a setting part that sets a threshold value for a received light amount per unit time of the reflected light based on feature information regarding a light amount of the optical measurement device; and a determination part that determines presence or absence of noise in the measured value based on the threshold value.

According to this aspect, the threshold value for the received light amount per unit time of the reflected light is set. Here, the inventors have found that the received light amount per unit time is less changed due to the measurement conditions than the received light amount, and is a substantially constant value for each target. Therefore, based on the threshold value for the received light amount per unit time of the reflected light, it is possible to determine the presence or absence of noise that may occur in the measured value without setting the threshold value for each measurement condition. Further, the threshold value for the received light amount per unit time of the reflected light is set based on the feature information regarding the light amount of the optical measurement device. In this way, for example, the ideal received light amount per unit time of the reflected light is used as a reference value, and based on the relative coefficient of the optical measurement device with respect to the reference value, it is possible to set the threshold value for the received light amount per unit time of the reflected light and to suppress the influence of variations in the light amount for each optical measurement device according to the variation in the light amount inherent in the optical measurement device. Therefore, it is possible to reduce the influence of the variation in the light amount inherent in the optical measurement device in the determination of the presence or absence of noise in the measured value.

In the above aspect, the optical measurement device may further include a controller that includes a light source for emitting light, and a sensor head that includes an optical system for condensing the reflected light, and the setting part may set the threshold value based on first feature information regarding a light amount of the controller and second feature information regarding a light amount of the sensor head.

According to this aspect, the threshold value for the received light amount per unit time of the reflected light is set based on the first feature information and the second feature information. In this way, it is possible to suppress the influence of both the variation in the light amount of the light source included in the controller and the variation in the light amount of the optical system included in the sensor head.

In the above aspect, the controller may further include a first storage part for storing the first feature information, and the sensor head may further include a second storage part for storing the second feature information.

According to this aspect, the first feature information is stored in the first storage part of the controller, and the second feature information is stored in the second storage part of the sensor head. In this way, when one of the controller and the sensor head is replaced—for example, when the sensor head is replaced—the first feature information remains stored in the first storage part of the controller. Therefore, the first feature information and the second feature information have to be calculated only once.

In the above aspect, the optical measurement device may further include an input part for inputting a parameter, and the setting part may set the threshold value based on the first feature information, the second feature information, and the parameter.

According to this aspect, the threshold value for the received light amount per unit time of the reflected light is set based on the first feature information, the second feature information, and the parameter. In this way, it is possible to set the threshold value according to the usage, application, and the like of the user while suppressing the influence of both the variation in the light amount of the light source and the variation in the light amount of the optical system.

In the above aspect, the optical measurement device may further include a measurement part that measures a distance from the optical measurement device to the target as the measured value based on the received light amount of the reflected light.

According to this aspect, the distance from the optical measurement device to the target is measured as the measured value based on the received light amount of the reflected light. In this way, it is possible to easily realize an optical measurement device that determines the presence or absence of noise in the measured distance and measures the distance to the target.

In the above aspect, when the determination part determines that there is noise in the distance, the measurement part may not measure the distance.

According to this aspect, when the determination part 53 determines that there is noise in the distance, the distance is not measured. In this way, it is possible to reduce the risk of the user using the value of noise that may occur in the measured distance.

In the above aspect, the light may include a plurality of wavelength components; the optical system may cause chromatic aberration to occur along an optical axis direction for the light, irradiate the target with the light having the chromatic aberration, and condense the reflected light; and the optical measurement device may further include a light reception part for detecting the received light amount of the reflected light and configured to be able to detect the received light amount for each of the wavelength components.

According to this aspect, chromatic aberration occurs along the optical axis direction for the light including a plurality of wavelength components, and the target is irradiated with the light having the chromatic aberration, and the reflected light reflected by the target is condensed; and the light reception part for detecting the received light amount of the reflected light is configured to be able to detect the received light amount for each of the wavelength components. In this way, it is possible to easily realize a white confocal type optical measurement device that determines the presence or absence of noise in the measured distance.

In the above aspect, the measurement part may measure the distance based on a peak received light amount in a received light amount distribution of each of the wavelength components of the reflected light.

According to this aspect, the distance is measured based on the peak received light amount in the received light amount distribution of each wavelength component of the reflected light. In this way, in the received light amount distribution of each wavelength component of the reflected light, the influence of non-peak wavelength components on the distance can be suppressed, and the distance can be measured based on the peak wavelength component focused on the target. Therefore, the distance from the optical measurement device to the target can be measured with stability and high accuracy.

Further, an optical measurement method according to another aspect of the disclosure is an optical measurement method using an optical measurement device that acquires a measured value based on a received light amount of reflected light reflected by a target, and the optical measurement method includes: a setting step of setting a threshold value for a received light amount per unit time of the reflected light based on feature information regarding a light amount of the optical measurement device; and a determination step of determining presence or absence of noise in the measured value based on the threshold value.

According to this aspect, the threshold value for the received light amount per unit time of the reflected light is set. Here, the inventors have found that the received light amount per unit time is less changed due to the measurement conditions than the received light amount, and is a substantially constant value for each target. Therefore, based on the threshold value for the received light amount per unit time of the reflected light, it is possible to determine the presence or absence of noise that may occur in the measured value without setting the threshold value for each measurement condition. Further, the threshold value for the received light amount per unit time of the reflected light is set based on the feature information regarding the light amount of the optical measurement device. In this way, for example, the ideal received light amount per unit time of the reflected light is used as a reference value, and based on the relative coefficient of the optical measurement device with respect to the reference value, it is possible to set the threshold value for the received light amount per unit time of the reflected light and to suppress the influence of variations in the light amount for each optical measurement device according to the variation in the light amount inherent in the optical measurement device. Therefore, it is possible to reduce the influence of the variation in the light amount inherent in the optical measurement device in the determination of the presence or absence of noise in the measured value.

In the above aspect, the optical measurement device may include a controller that includes a light source for emitting light, and a sensor head that includes an optical system for condensing the reflected light, and the setting step may include setting the threshold value based on first feature information regarding a light amount of the controller and second feature information regarding a light amount of the sensor head.

According to this aspect, the threshold value for the received light amount per unit time of the reflected light is set based on the first feature information and the second feature information. In this way, it is possible to suppress the influence of both the variation in the light amount of the light source included in the controller and the variation in the light amount of the optical system included in the sensor head.

In the above aspect, the optical measurement method may further include an input step for inputting a parameter, and the setting step may include setting the threshold value based on the first feature information, the second feature information, and the parameter.

According to this aspect, the threshold value for the received light amount per unit time of the reflected light is set based on the first feature information, the second feature information, and the parameter. In this way, it is possible to set the threshold value according to the usage, application, and the like of the user while suppressing the influence of both the variation in the light amount of the light source and the variation in the light amount of the optical system.

In the above aspect, the optical measurement method may further include a measurement step of measuring a distance from the optical measurement device to the target as the measured value based on the received light amount of the reflected light.

According to this aspect, the distance from the optical measurement device to the target is measured as the measured value based on the received light amount of the reflected light. In this way, it is possible to easily realize an optical measurement method that determines the presence or absence of noise in the measured distance and measures the distance to the target.

In the above aspect, when the determination step determines that there is noise in the distance, the measurement step may not measure the distance.

According to this aspect, when the determination step determines that there is noise in the distance, the distance is not measured. In this way, it is possible to reduce the risk of the user using the value of noise that may occur in the measured distance.

In the above aspect, the light may include a plurality of wavelength components; and the optical measurement method may further include: a step of causing chromatic aberration to occur along an optical axis direction for the light, irradiating the target with the light having the chromatic aberration, and condensing the reflected light; and a step of detecting the received light amount of the reflected light by a light reception part configured to be able to detect the received light amount for each of the wavelength components.

According to this aspect, chromatic aberration occurs along the optical axis direction for the light including a plurality of wavelength components, and the target is irradiated with the light having the chromatic aberration, and the reflected light reflected by the target is condensed; and the light reception part configured to be able to detect the received light amount for each of the wavelength components detects the received light amount of the reflected light. In this way, it is possible to easily realize a white confocal type optical measurement method that determines the presence or absence of noise in the measured distance.

In the above aspect, the measurement step may include measuring the distance based on a peak received light amount in a received light amount distribution of each of the wavelength components of the reflected light.

According to this aspect, the distance is measured based on the peak received light amount in the received light amount distribution of each wavelength component of the reflected light. In this way, in the received light amount distribution of each wavelength component of the reflected light, the influence of non-peak wavelength components on the distance can be suppressed, and the distance can be measured based on the peak wavelength component focused on the target. Therefore, the distance from the optical measurement device to the target can be measured with stability and high accuracy.

Effects

According to the disclosure, it is possible to determine the presence or absence of noise that may occur in the measured value without setting a threshold value for each measurement condition.

DESCRIPTION OF THE EMBODIMENTS

Figure 1:
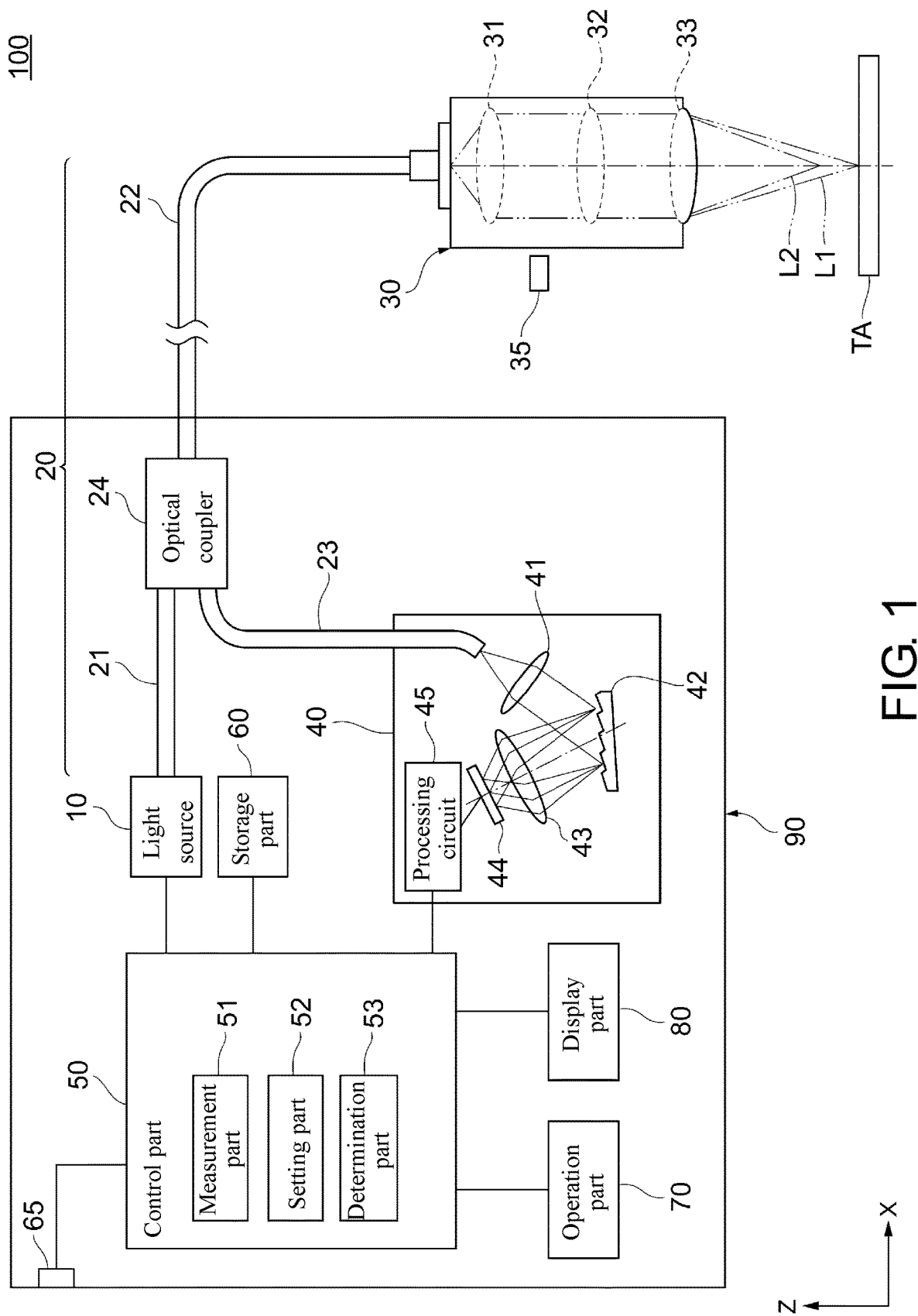
FIG. 1 is a configuration diagram illustrating a schematic configuration of an optical measurement device according to the first embodiment.

Exemplary embodiments of the disclosure will be described with reference to the accompanying drawings. Further, in each of the drawings, the parts denoted by the same reference numerals have the same or similar configurations.

First Embodiment

First, the configuration of the optical measurement device according to the first embodiment will be described with reference to FIG. 1. FIG. 1 is a configuration diagram illustrating a schematic configuration of an optical measurement device 100 according to the first embodiment.

As shown in FIG. 1, the optical measurement device 100 includes a light source 10, a light guide part 20, a sensor head 30, a light reception part 40, a control part 50, a storage part 60, an input/output interface (I/F) 65, an operation part 70, and a display part 80. The light source 10, a portion of the light guide part 20, the light reception part 40, the control part 50, the storage part 60, the operation part 70, and the display part 80 are housed in a controller 90.

However, each part of the optical measurement device 100 is not limited to the configuration of being separately housed in the sensor head 30 and the controller 90. For example, each part of the optical measurement device 100 may be housed in three or more parts.

The optical measurement device 100 measures a distance from the device, specifically, from the sensor head 30, to a target TA in a predetermined measurement cycle.

The light source 10 is configured to emit light including a plurality of wavelength components. The light source 10 operates based on a control signal input from the control part 50, and changes the light amount of the light based on the control signal, for example. The light source 10 is configured by including, for example, a white light emitting diode (LED) to emit white light. However, the light emitted by the light source 10 may be any light including a wavelength range that covers the distance range required for the optical measurement device 100, and is not limited to white light.

The light guide part 20 is for propagating light. The light guide part 20 includes, for example, a first cable 21, a second cable 22, a third cable 23, and an optical coupler 24.

One end (the left end in FIG. 1) of the first cable 21 is optically connected to the light source 10. One end (the right end in FIG. 1) of the second cable 22 is optically connected to the sensor head 30. One end (the left end in FIG. 1) of the third cable 23 is optically connected to the light reception part 40. The other end (the right end in FIG. 1) of the first cable 21, the other end (the right end in FIG. 1) of the third cable 23, and the other end (the left end in FIG. 1) of the second cable 22 are optically connected via the optical coupler 24.

The optical coupler 24 transmits the light incident from the first cable 21 to the second cable 22, and divides the light incident from the second cable 22 and transmits it to the first cable 21 and the third cable 23, respectively. Further, the light transmitted from the second cable 22 to the first cable 21 by the optical coupler 24 is terminated at the light source 10.

The optical coupler 24 is configured by including, for example, a fusion-stretching type (melt-stretching type) optical coupler. In addition, the first cable 21, the second cable 22, and the third cable 23 are each configured by, for example, an optical fiber. Each optical fiber may be a single core having one single core or a multi-core having a plurality of cores.

The sensor head 30 includes, for example, a collimator lens 31, a diffraction lens 32, an objective lens 33, and a storage part 35. The collimator lens 31, the diffraction lens 32, and the objective lens 33 are configured to irradiate the target TA with light. Further, the collimator lens 31, the diffraction lens 32, and the objective lens 33 are configured to condense the reflected light reflected by the target TA. The collimator lens 31, the diffraction lens 32, and the objective lens 33 according to the embodiment correspond to an example of the "optical system" of the disclosure.

The collimator lens 31 is configured to convert the light incident from the second cable into parallel light. The diffraction lens 32 is configured to cause chromatic aberration to occur along the optical axis direction for the parallel light. The objective lens 33 is configured to condense the light having the chromatic aberration and irradiate the target TA with the light. Since the diffraction lens 32 causes axial chromatic aberration, the light emitted from the objective lens 33 has a focal point at a different distance (position) for each wavelength.

In the example shown in FIG. 1, light L1 with a first wavelength having a relatively long focal length and light L2 with a second wavelength having a relatively short focal length are shown. The light L1 with the first wavelength is focused on the surface of the target TA, while the light L2 with the second wavelength is focused before the target TA.

The light reflected by the surface of the target TA passes through the objective lens 33 and the diffraction lens 32, is condensed by the collimator lens 31, and is incident on the second cable 22. The light L1 with the first wavelength in the reflected light is focused on the end surface of the second cable 22 which is confocal, and most of it is incident on the second cable 22. On the other hand, other wavelengths are out of focus on the end surface of the second cable 22 and are not incident on the second cable 22. A portion of the reflected light incident on the second cable 22 is transmitted to the third cable 23 by the optical coupler 24 and emitted to the light reception part 40.

When the second cable 22 is an optical fiber, its core corresponds to a pinhole. Therefore, by reducing the core diameter of the optical fiber, the pinhole that condenses the reflected light becomes small, and the light having a wavelength focused on the surface of the target TA can be stably detected.

The storage part 35 is configured to store programs, data, and the like. The storage part 35 is configured by, for example, a flash memory or the like. In the embodiment, the storage part 35 is a removable medium attached to the sensor head 30. The storage part 35 is configured to store a relative coefficient of the sensor head 30 with respect to a predetermined reference value (hereinafter referred to as the "sensor head relative coefficient"). Details of the sensor head relative coefficient will be described later. Further, the sensor head relative coefficient corresponds to an example of the "second feature information" of the disclosure.

The light reception part 40 is for detecting the received light amount of the reflected light reflected by the surface of the target TA and condensed by the sensor head 30. The light reception part 40 includes, for example, a collimator lens 41, a diffraction grating 42, an adjustment lens 43, a light reception sensor 44, and a processing circuit 45.

The collimator lens 41 is configured to convert the light incident from the third cable into parallel light. The diffraction grating 42 is configured to disperse (separate) the parallel light for each wavelength component. The adjustment lens 43 is configured to adjust the spot diameter of the dispersed light with each wavelength.

The light reception sensor 44 is configured to be able to detect the received light amount for each wavelength component of the dispersed light. The light reception sensor 44 includes a plurality of light reception elements. Each light reception element is arranged in one dimension corresponding to the dispersion direction of the diffraction grating 42. As a result, each light reception element is disposed corresponding to the dispersed light with each wavelength component, and the light reception sensor 44 is able to detect the received light amount for each wavelength component.

One light reception element of the light reception sensor 44 corresponds to one pixel. Therefore, it can be said that the light reception sensor 44 is configured so that each of a plurality of pixels is able to detect the received light amount. Further, the light reception elements are not limited to the case where they are arranged in one dimension, and may be arranged in two dimensions. For example, it is preferable that the light reception elements are arranged in two dimensions on the detection surface including the dispersion direction of the diffraction grating 42.

Each light reception element accumulates electric charges according to the received light amount of the received light during a predetermined exposure time based on the control signal input from the processing circuit 45. Then, each light reception element outputs an electric signal according to the accumulated electric charges during a non-exposure time, that is, other than the exposure time, based on the control signal input from the processing circuit 45. In this way, the received light amount received during the exposure time is converted into an electric signal.

The processing circuit 45 is configured to control light reception by the light reception sensor 44. Further, the processing circuit 45 is configured to perform signal processing for outputting the electric signal input from each light reception element of the light reception sensor 44 to the control part 50. The processing circuit 45 is configured by including, for example, an amplifier circuit and an analog-to-digital (A/D) conversion circuit. The amplifier circuit amplifies the electric signal input from each light reception element with a predetermined gain. Then, the A/D conversion circuit samples, quantizes, and encodes the amplified electric signal of each light reception element, and converts it into a digital signal. In this way, the received light amount detected by each light reception element is converted into a digital value, and a received light amount distribution signal for each light reception element, that is, for each wavelength component (hereinafter simply referred to as the "received light amount distribution signal") is acquired. The processing circuit 45 outputs this received light amount distribution signal to the control part 50. The predetermined exposure time of each light reception element, the predetermined gain of the amplifier circuit, and the like may be changed based on the control signal. For example, when the shape or reflectance of the surface of the target TA changes and the received light amount detected by each light reception element decreases, the exposure time is changed to a longer time so that a received light amount sufficient for measurement is acquired.

The control part 50 is configured to control the operation of each part of the optical measurement device 100. Further, the control part 50 is configured to realize each function described later by executing a program stored in the storage part 60 or the like. The control part 50 is configured by including, for example, a microprocessor such as a central processing unit (CPU) and a memory such as a read only memory (ROM), a random access memory (RAM), and a buffer memory.

The storage part 60 is configured to store programs, data, and the like. The storage part 60 is configured by including, for example, a hard disk drive, a solid state drive, and the like. The storage part 60 stores in advance various programs executed by the control part 50, data necessary for executing the programs, and the like. Further, the storage part 60 is configured to store a relative coefficient of the controller 90 with respect to a predetermined reference value (hereinafter referred to as the "controller relative coefficient"). Details of the controller relative coefficient will be described later. Further, the controller relative coefficient corresponds to an example of the "first feature information" of the disclosure.

The input/output I/F 65 is an interface between the controller 90 and an external device. The input/output I/F 65 is configured to exchange data and signals with an external device. Further, the input/output I/F 65 is configured to control communication with an external device. In the embodiment, the input/output I/F 65 is configured by including a connection terminal for connecting to the storage part 35 attached to the sensor head 30. When the storage part 35 is inserted and connected to the input/output I/F 65, the control part 50 is able to read the programs, data, and the like stored in the storage part 35 via the input/output I/F 65.

Further, the control part 50 includes, for example, a measurement part 51, a setting part 52, and a determination part 53 as its functional configuration.

The measurement part 51 is configured to measure the distance from the optical measurement device 100 to the target TA, specifically, the distance from the sensor head 30 to the target TA, based on the received light amount of the reflected light.

In the example shown in FIG. 1, the measured distance is the distance in the Z-axis direction. More specifically, the measurement part 51 is configured to measure the distance based on the received light amount distribution signal acquired by the light reception part 40.

Figure 2:
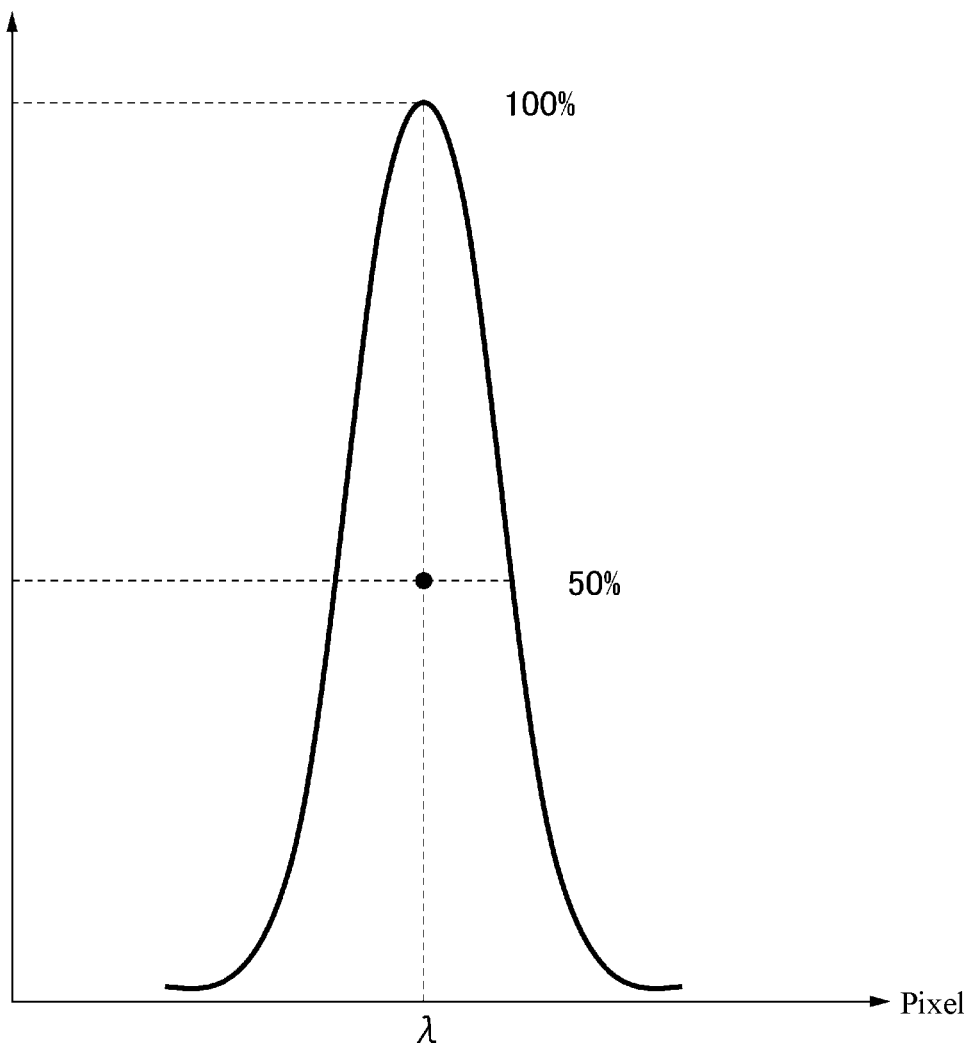
FIG. 2 is a waveform diagram illustrating an example of the received light amount distribution signal acquired by the light reception part shown in FIG. 1.

Here, the measurement of the distance based on the received light amount distribution signal will be described with reference to FIG. 2. FIG. 2 is a waveform diagram illustrating an example of the received light amount distribution signal acquired by the light reception part 40 shown in FIG. 1. In FIG. 2, the horizontal axis is the pixel (each light reception element of the light reception sensor 44), and the vertical axis is the received light amount.

As shown in FIG. 2, the received light amount distribution signal usually has a waveform in which the received light amount of a certain pixel becomes the peak. As described above, since the distance from the sensor head 30 to the focal point differs due to the wavelength, the pixel with the peak received light amount in the received light amount distribution signal acquired by the light reception sensor 44 is a pixel corresponding to the wavelength of the light emitted from the sensor head 30 and focused on the target TA. And this wavelength corresponds to the distance from the sensor head 30 to the target TA. In the example shown in FIG. 1, the light L1 with the first wavelength focused on the surface of the target TA represents the wavelength of the peak received light amount in the received light amount distribution signal.

Specifically, when the peak received light amount in the received light amount distribution signal is set to 100%, an intermediate point at the intersection of the 50% received light amount line and the received light amount distribution signal is acquired, and the wavelength $\lambda$ corresponding to the pixel at the intermediate point is acquired.

The relationship (correspondence) between the wavelength $\lambda$ and the distance is stored in advance in the memory or the like of the control part 50. By referring to this relationship, the measurement part 51 measures the distance from the sensor head 30 to the target TA based on the wavelength $\lambda$ of the peak received light amount in the received light amount distribution signal of the reflected light. In this way, in the received light amount distribution of each wavelength component of the reflected light, the influence of non-peak wavelength components on the distance can be suppressed, and the distance can be measured based on the peak wavelength component focused on the target TA. Therefore, the distance from the optical measurement device 100 to the target TA can be measured with stability and high accuracy.

With reference back to the description of FIG. 1, the setting part 52 is configured to set a threshold value for the received light amount per unit time of the reflected light based on the feature information regarding the light amount of the optical measurement device 100. The received light amount per unit time of the reflected light is calculated by dividing the received light amount of the reflected light by the exposure time. In the embodiment, a relative coefficient of the optical measurement device 100 with respect to a predetermined reference value is used as an example of the feature information regarding the light amount of the optical measurement device 100. The relative coefficient of the optical measurement device 100 includes, for example, the controller relative coefficient and the sensor head relative coefficient described above.

The determination part 53 is configured to determine the presence or absence of noise in the measured distance based on the set threshold value.

Figure 3:
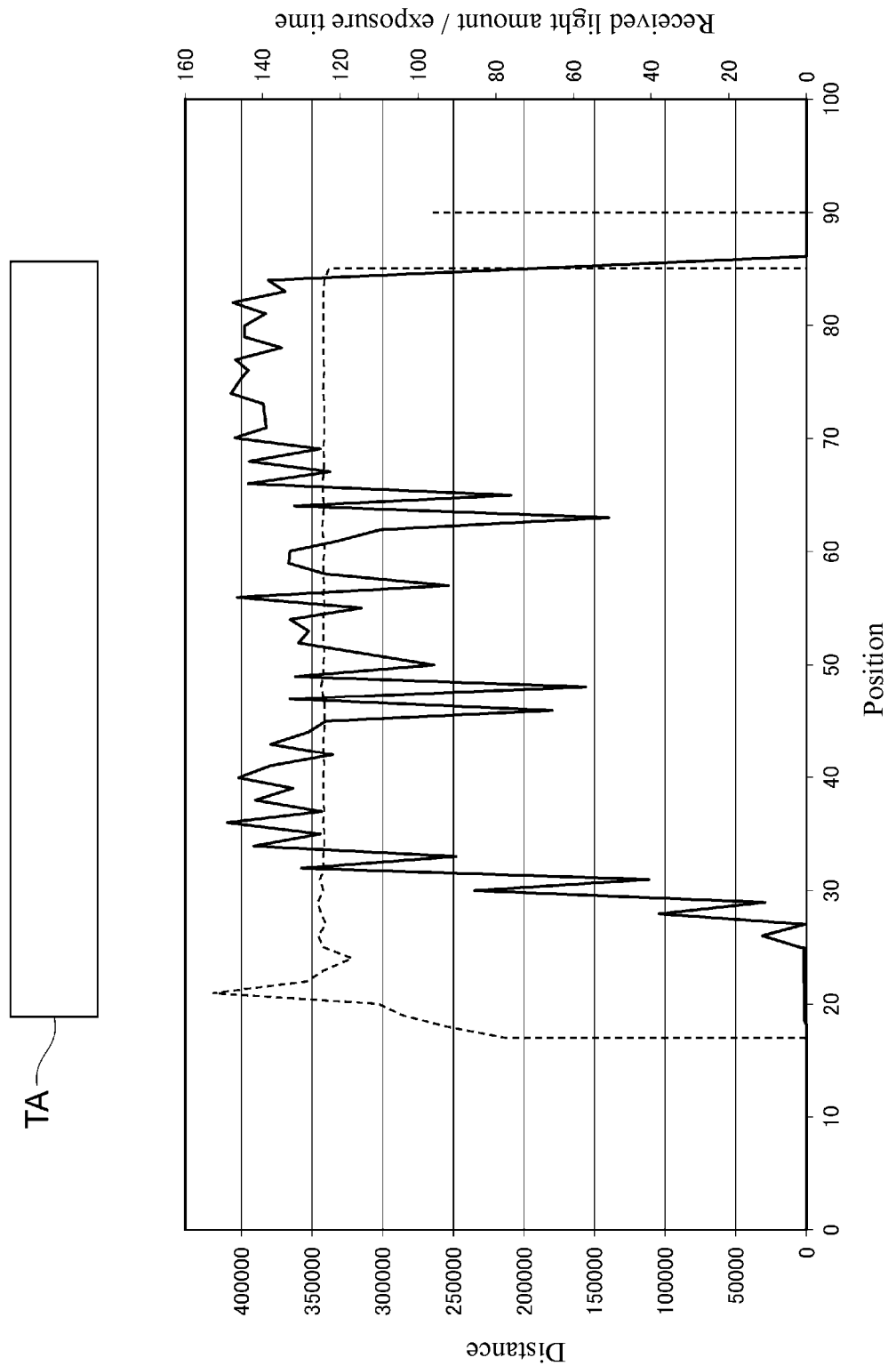
FIG. 3 is a diagram illustrating the relationship between the measured distance and the received light amount per unit time.
Figure 4:
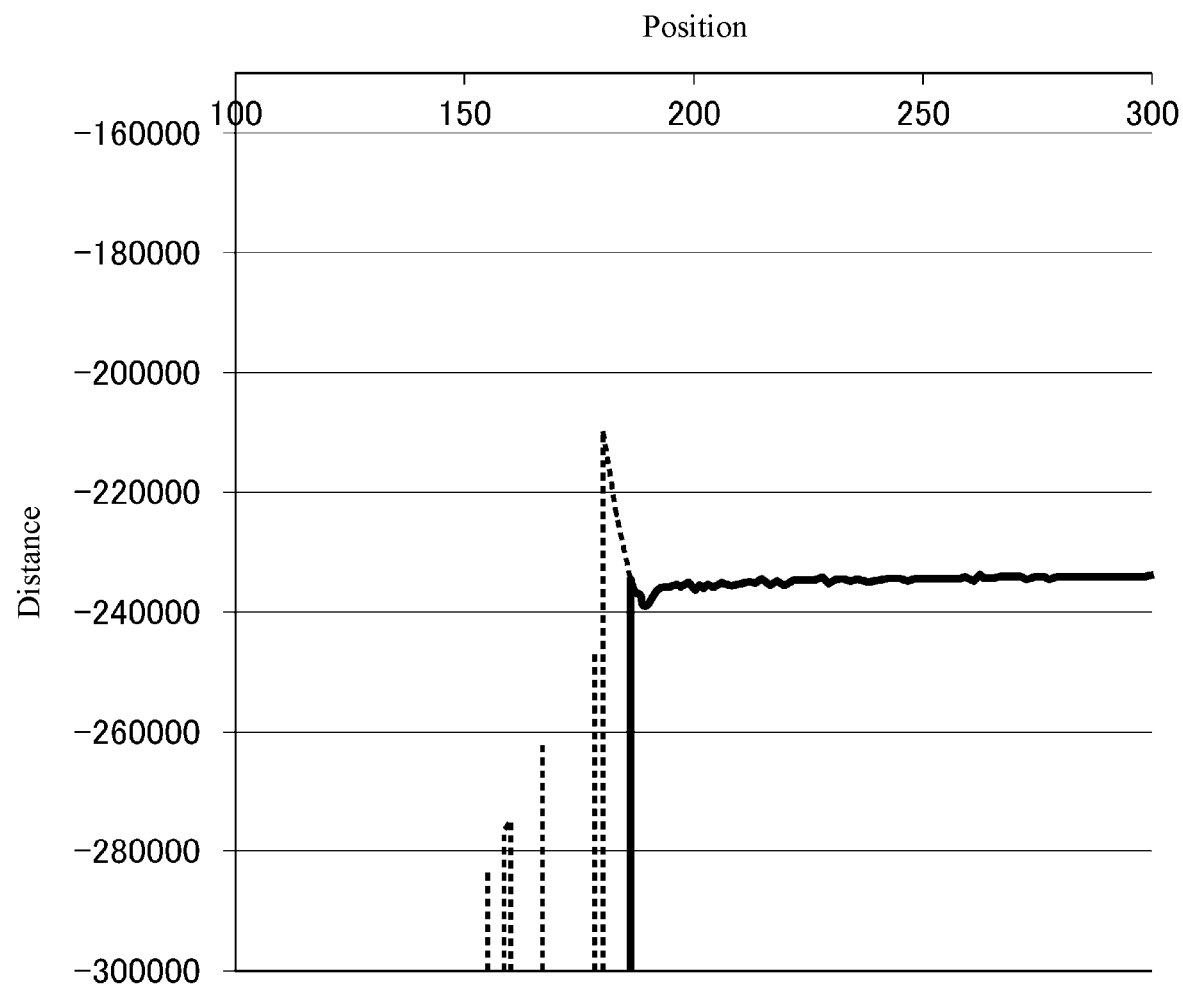
FIG. 4 is a graph illustrating the relationship between the distance measured by the optical measurement device according to the first embodiment and the distance measured by an optical measurement device according to a conventional example.

Here, the noise in the measured distance will be described with reference to FIGS. 3 and 4. FIG. 3 is a diagram illustrating the relationship between the measured distance and the received light amount per unit time. In the graph of FIG. 3, the horizontal axis is the position in the X-axis direction shown in FIG. 1; one vertical axis (the vertical axis on the left side in FIG. 3) is the distance measured by the measurement part 51; and the other vertical axis (the vertical axis on the right side in FIG. 3) is the received light amount/exposure time. In FIG. 3, the range of the distance from 0 to 400000 actually corresponds to the range of 10 mm to 9.6 mm as the distance from the measurement device. FIG. 4 is a graph illustrating the relationship between the distance measured by the optical measurement device 100 according to the first embodiment and the distance measured by an optical measurement device according to a conventional example. In FIG. 4, the horizontal axis is the position in the X-axis direction shown in FIG. 1, and the vertical axis is the distance measured by the optical measurement device 100 or the optical measurement device according to the conventional example. In FIG. 4, the range of the distance from −300000 to −160000 actually corresponds to the range of 10.3 mm to 10.16 mm as the distance from the measurement device. The target TA has a glossy metal surface, and the light projected from the light source 10 is diffusely reflected by the surface of the target TA. Further, the distances in FIGS. 3 and 4 are measured by moving the sensor head 30 or the sensor head according to the conventional example in the X-axis direction shown in FIG. 1 with respect to the target TA.

As shown in FIG. 3, at one end of the target TA (the left end in FIG. 3), noise (outlier) occurs in the distance measured by the measurement part 51, which is indicated by the broken line. On the other hand, the received light amount/exposure time shown by the solid line, that is, the received light amount (reflected power) per unit time is less than a predetermined value at the one end, and is a substantially constant value at the other part of the target TA. Further, the received light amount (reflected power) per unit time is also less than a predetermined value at the other end (the right end in FIG. 3) of the target TA. Here, the inventors have found that the received light amount per unit time is less changed due to the measurement conditions than the received light amount, and is a substantially constant value for each target. Therefore, based on the threshold value for the received light amount per unit time of the reflected light, it is possible to determine the presence or absence of noise that may occur in the measured distance without setting the threshold value for each measurement condition.

Further, it is known that optical measurement devices have variations in the light amount inherent in the devices. Therefore, if the same threshold value is set in all the optical measurement devices, the measured value determined to have noise in one optical measurement device may be determined to have no noise in another optical measurement device. As described above, the determination of the presence or absence of noise in the distance measured as the measured value may be influenced by the variations in the light amount of the optical measurement device.

In this regard, in the optical measurement device 100 of the embodiment, the threshold value for the received light amount per unit time of the reflected light is set based on the feature information regarding the light amount of the optical measurement device 100. In this way, for example, the ideal received light amount per unit time of the reflected light is used as the reference value, and based on the relative coefficient of the optical measurement device 100 with respect to the reference value, it is possible to set the threshold value for the received light amount per unit time of the reflected light and to suppress the influence of variations in the light amount of each optical measurement device according to the variation in the light amount inherent in the optical measurement device 100. Therefore, it is possible to reduce the influence of the variation in the light amount inherent in the optical measurement device 100 in the determination of the presence or absence of noise in the measured distance.

When the determination part 53 determines that there is noise in the distance, the measurement part 51 is configured not to measure the distance from the sensor head 30 to the target TA. For example, it is realized in the following way: when the determination part 53 determines that there is noise in the distance, the measurement part 51 outputs a reference value (e.g., "zero") without measuring the distance. Alternatively, it may be realized in the following way: when the determination part 53 determines that there is noise in the distance, the measurement part 51 stores the measured distance in a memory or the like and leaves a record, but does not output it to the display part 80.

As shown in FIG. 4, noise (outlier) occurs in a range of the distance measured by the optical measurement device according to the conventional example shown by the broken line.

On the other hand, the distance measured by the optical measurement device 100 shown by the solid line does not display the distance measured by the measurement part 51 in that range. In this way, when the determination part 53 determines that there is noise in the distance, the measurement part 51 does not measure the distance, whereby it is possible to reduce the risk of the user using the value of noise that may occur in the measured distance.

With reference back to the description of FIG. 1, the operation part 70 is for inputting information by an operation of the user. The operation part 70 is configured by including, for example, a button, a switch, and the like. In this case, when the user operates the button, the switch, and the like, a signal corresponding to the operation is input to the control part 50.

Then, the control part 50 generates data corresponding to the signal, whereby the information can be input to the optical measurement device 100.

The display part 80 is for outputting information. Specifically, the display part 80 is configured to display, for example, the measured distance, the setting contents, the operation state, the communication state, and the like. The display part 80 is configured by including, for example, a multi-digit 7- or 11-segment display and an indicator lamp that emits light in a plurality of colors.

Figure 5:
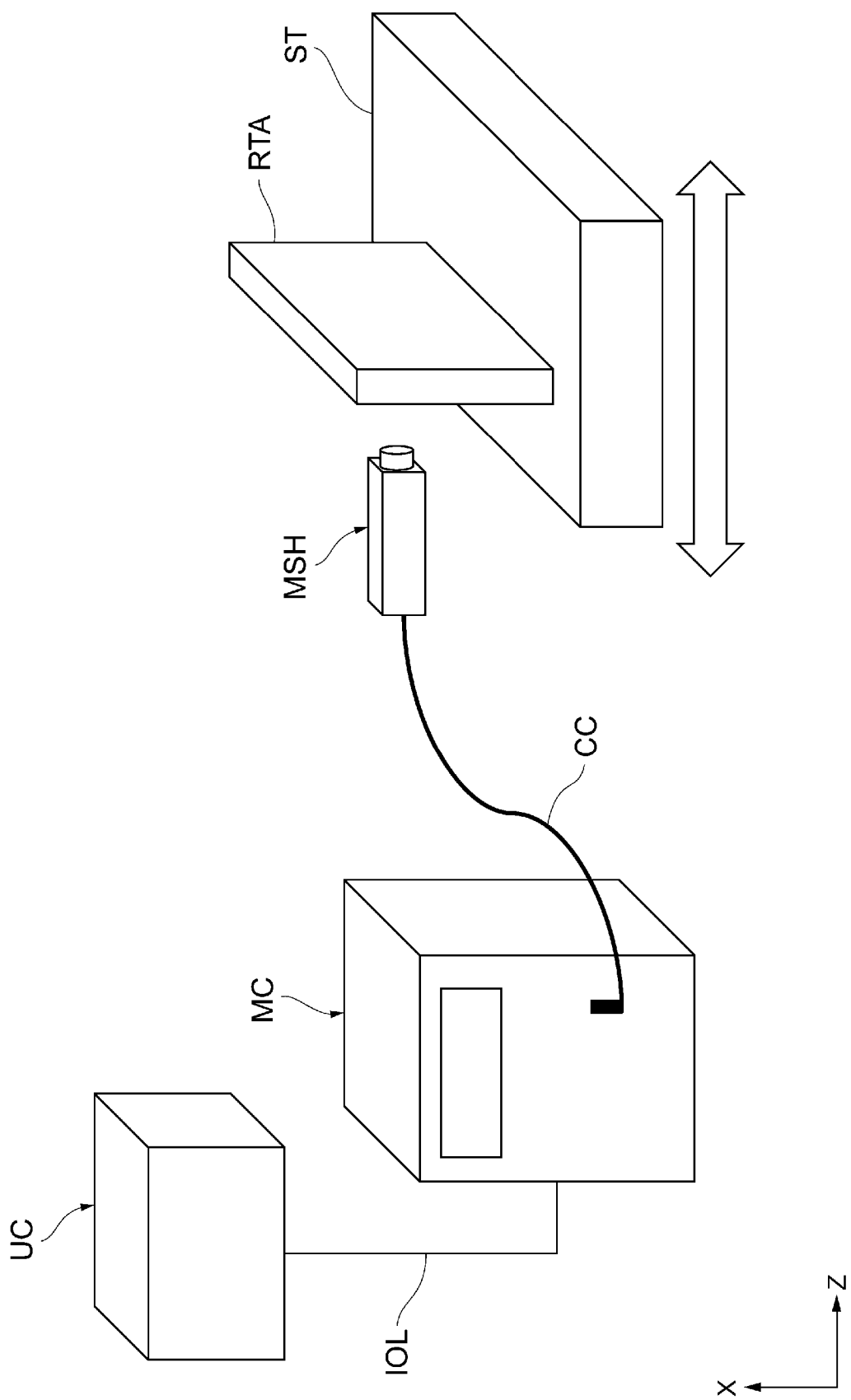
FIG. 5 is a configuration diagram illustrating a schematic configuration for acquiring a reference value of the relative coefficient of the optical measurement device shown in FIG. 1.
Figure 6:
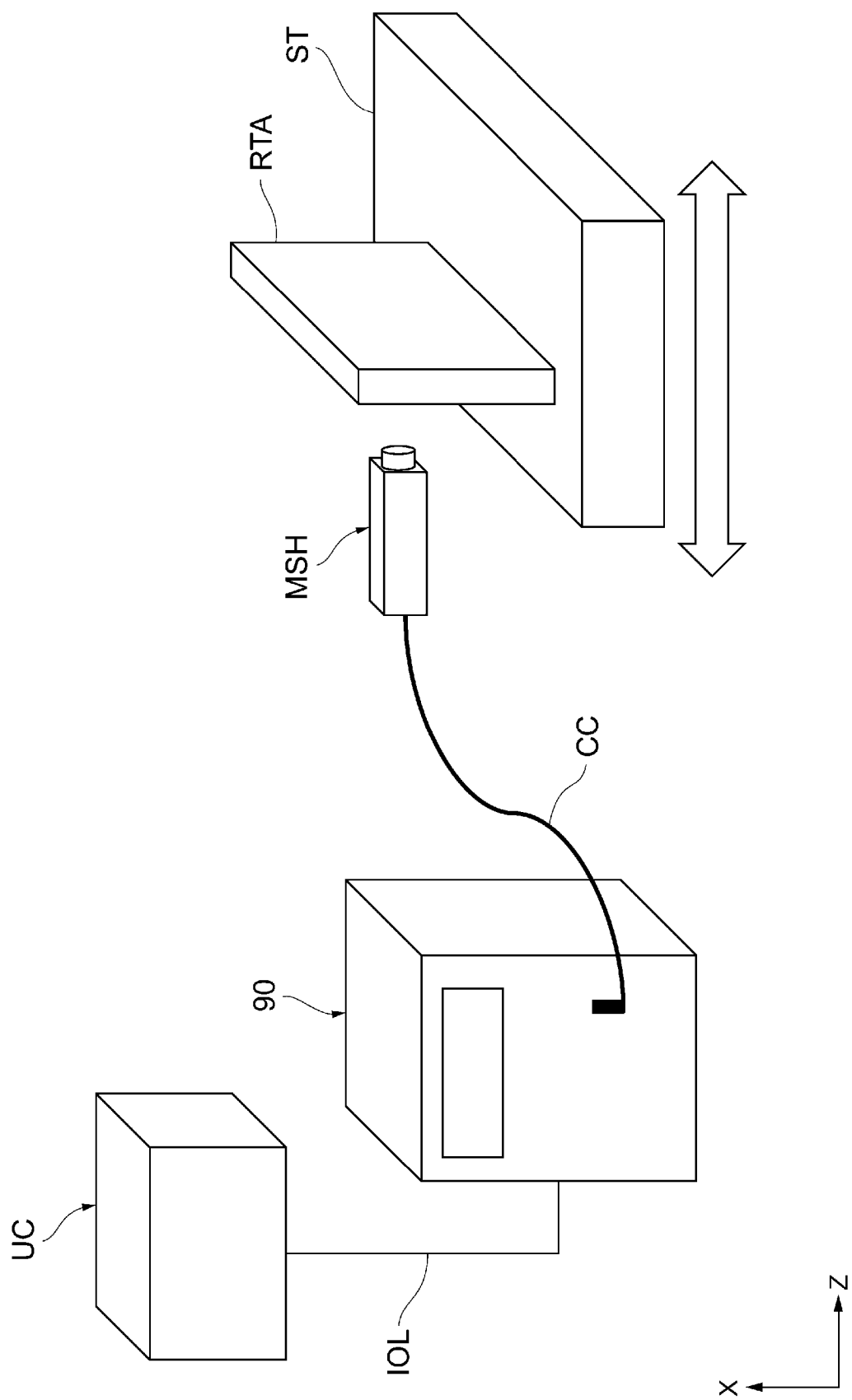
FIG. 6 is a configuration diagram illustrating a schematic configuration for acquiring the controller relative coefficient of the controller shown in FIG. 1.
Figure 7:
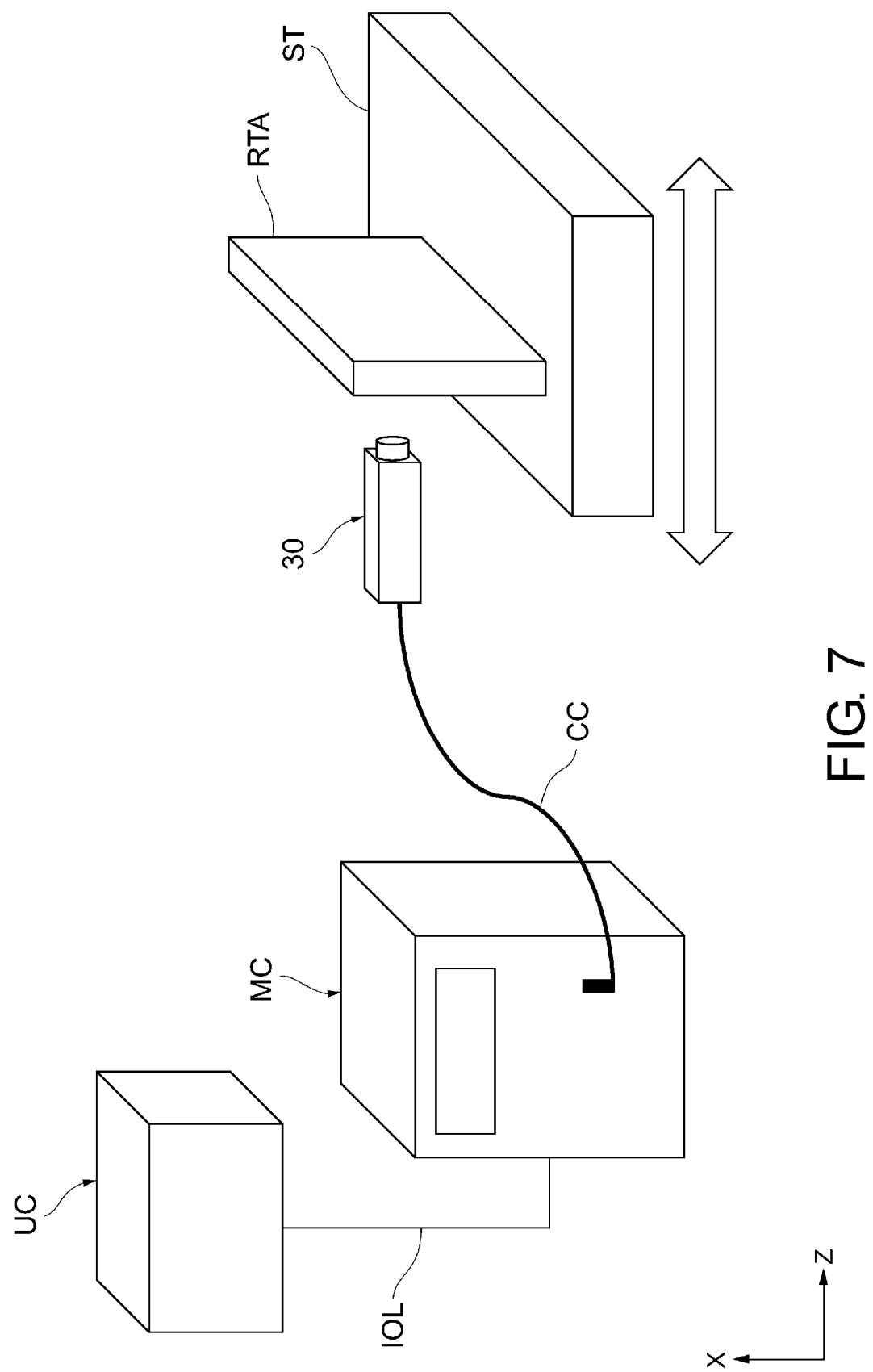
FIG. 7 is a configuration diagram illustrating a schematic configuration for acquiring the sensor head relative coefficient of the sensor head shown in FIG. 1.

Next, the relative coefficient of the optical measurement device 100 will be described with reference to FIGS. 5 to 7. FIG. 5 is a configuration diagram illustrating a schematic configuration for acquiring a reference value of the relative coefficient of the optical measurement device 100 shown in FIG. 1. FIG. 6 is a configuration diagram illustrating a schematic configuration for acquiring the controller relative coefficient of the controller 90 shown in FIG. 1. FIG. 7 is a configuration diagram illustrating a schematic configuration for acquiring the sensor head relative coefficient of the sensor head 30 shown in FIG. 1.

In order to acquire the relative coefficient of the optical measurement device 100, it is necessary to determine a reference value in advance. The reference value is determined by, for example, a combination of a master controller MC and a master sensor head MSH, as shown in FIG. 5. The master controller MC is a controller that serves as a reference for the controller 90, and is adjusted so that the light amount under a predetermined condition becomes an ideal value; that is, there is no variation in the light amount or the variation becomes extremely small. Similarly, the master sensor head MSH is a sensor head that serves as a reference for the sensor head 30, and is adjusted so that the light amount under a predetermined condition becomes an ideal value; that is, there is no variation in the light amount or the variation becomes extremely small. A connection cable CC includes the second cable 22 shown in FIG. 1 and connects the master controller MC and the master sensor head MSH. In addition, since the master controller MC has the same configuration as the controller 90, the description thereof will be omitted.

Further, since the master sensor head MSH also has the same configuration as the sensor head 30, the description thereof will be omitted.

In an optical measurement device that combines the master controller MC and the master sensor head MSH, a received light amount of reflected light of a reference target RTA is detected under a predetermined condition, and the received light amount per unit time is calculated based on the received light amount of the reflected light. The reference target RTA is a target having a relatively high reflectance, such as a mirror. Further, the reference target RTA is disposed on a stage ST that can move in the Z-axis direction. By moving the stage ST, the distance between the master sensor head MSH and the reference target RTA is set to, for example, an intermediate value of the measurable distance of the optical measurement device. Further, sensitivity parameters such as the exposure time are fixed to predetermined values and set to be unchangeable.

The received light amount per unit time of the reflected light of the reference target RTA calculated under the above-mentioned conditions is transmitted from the master controller MC to a host controller UC via an input/output line IOL. For example, the host controller UC stores the received light amount per unit time of the reflected light of the reference target RTA received from the master controller MC as the reference value in a storage device (not shown).

Next, among the relative coefficient of the optical measurement device 100, the controller relative coefficient is acquired. The controller relative coefficient is determined, for example, in an inspection process of the controller 90. As shown in FIG. 6, the controller 90 is connected to the master sensor head MSH by the connection cable CC. In a combination of the controller 90 and the master sensor head MSH, the received light amount of the reflected light of the reference target RTA is detected, and the received light amount per unit time is calculated based on the received light amount of the reflected light.

The conditions for detecting the received light amount of the reflected light and calculating the received light amount per unit time are the same as when the above-described reference value is determined. That is, the distance between the master sensor head MSH and the reference target RTA is set to the intermediate value of the measurable distance of the optical measurement device with the combination of the controller 90 and the master sensor head MSH. Further, the sensitivity parameters such as the exposure time are fixed to predetermined values and set to be unchangeable.

The controller 90 acquires the above-described reference value from the host controller UC via the input/output line IOL, and divides the calculated received light amount per unit time of the reflected light of the reference target RTA by the reference value. In this way, the relative coefficient of the controller 90 with respect to the reference value, that is, the controller relative coefficient, is calculated. The calculated controller relative coefficient is stored in the storage part 60 of the controller 90 shown in FIG. 1.

Next, among the relative coefficient of the optical measurement device 100, the sensor head relative coefficient is acquired. The sensor head relative coefficient is determined, for example, in an inspection process of the sensor head 30. As shown in FIG. 7, the sensor head 30 is connected to the master controller MC by the connection cable CC. In a combination of the master controller MC and the sensor head 30, the received light amount of the reflected light of the reference target RTA is detected, and the received light amount per unit time is calculated based on the received light amount of the reflected light.

The conditions for detecting the received light amount of the reflected light and calculating the received light amount per unit time are the same as when the above-described reference value is determined. That is, the distance between the sensor head 30 and the reference target RTA is set to the intermediate value of the measurable distance of the optical measurement device with the combination of the master controller MC and the sensor head 30. Further, the sensitivity parameters such as the exposure time are fixed to predetermined values and set to be unchangeable.

The master controller MC acquires the above-described reference value from the host controller UC via the input/output line IOL, and divides the calculated received light amount per unit time of the reflected light of the reference target RTA by the reference value. In this way, the relative coefficient of the sensor head 30 with respect to the reference value, that is, the sensor head relative coefficient, is calculated. The calculated sensor head relative coefficient is stored in the storage part 35 of the sensor head 30 shown in FIG. 1. In this way, by storing the controller relative coefficient in the storage part 60 of the controller 90 and storing the sensor head relative coefficient in the storage part 35 of the sensor head 30, when one of the controller 90 and the sensor head 30 is replaced—for example, when the sensor head 30 is replaced—the controller relative coefficient remains stored in the storage part 60 of the controller 90. Therefore, the controller relative coefficient and the sensor head relative coefficient have to be calculated only once.

The relative coefficient of the optical measurement device 100 can be expressed by multiplying the controller relative coefficient and the sensor head relative coefficient.

The setting part 52 sets the threshold value for the received light amount per unit time of the reflected light based on the controller relative coefficient and the sensor head relative coefficient. In this way, it is possible to suppress the influence of both the variation in the light amount of the light source 10 included in the controller 90 and the variation in the light amount of the collimator lens 31, the diffraction lens 32, and the objective lens 33 included in the sensor head 30.

Figure 8:
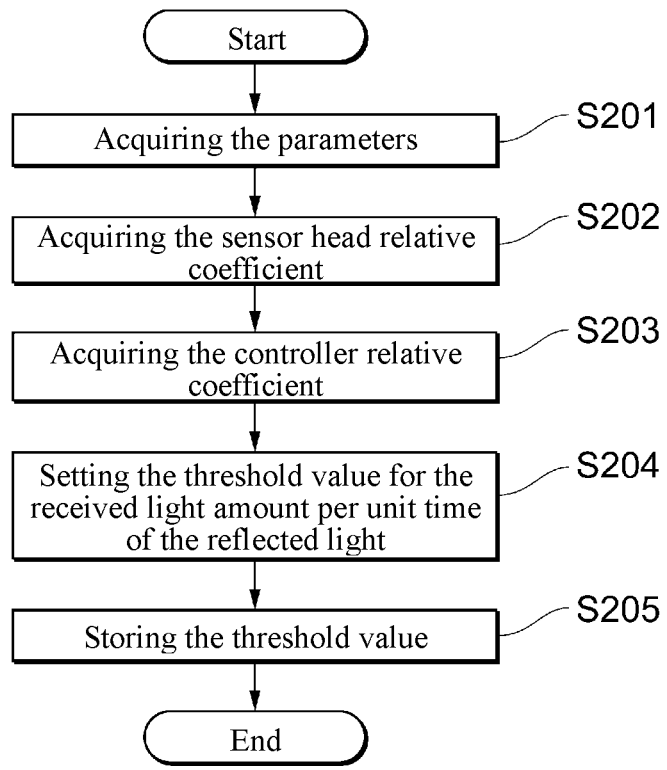
FIG. 8 is a flowchart illustrating a schematic operation of setting the threshold value for the received light amount per unit time of the reflected light in the optical measurement device of the first embodiment.
Figure 9:
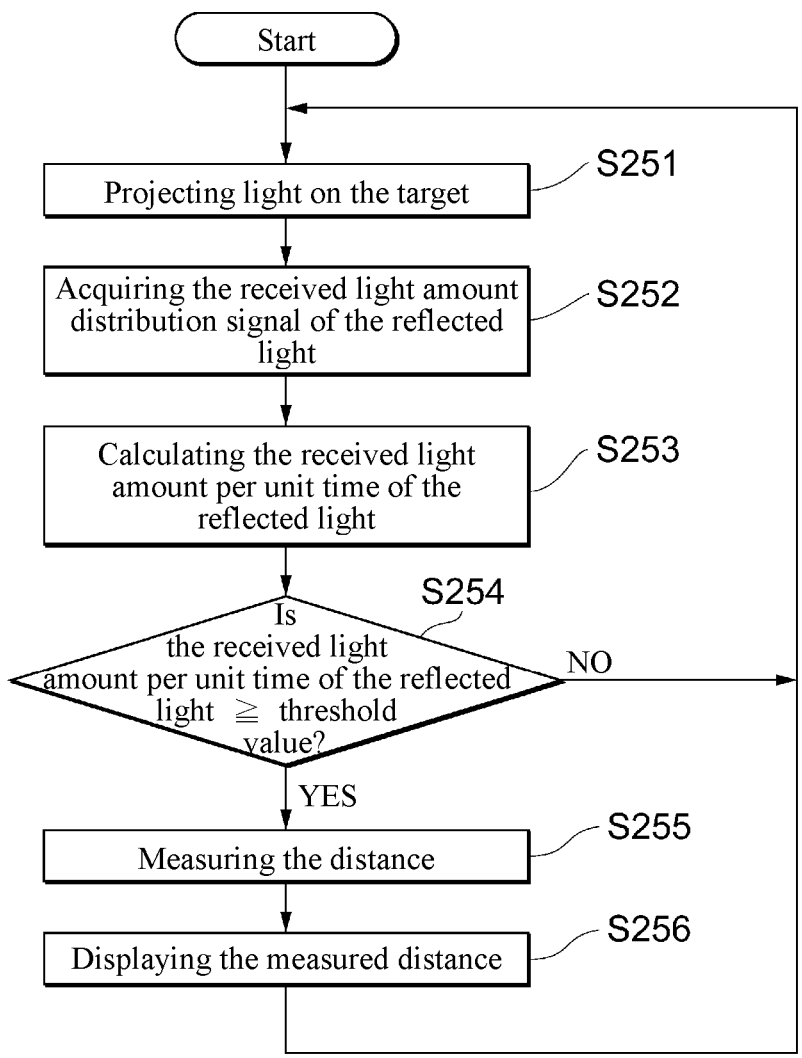
FIG. 9 is a flowchart illustrating a schematic operation of measuring the distance to the target in the optical measurement device of the first embodiment.

Next, an example of the operation of the optical measurement device according to the first embodiment will be described with reference to FIGS. 8 and 9. FIG. 8 is a flowchart illustrating a schematic operation of setting the threshold value for the received light amount per unit time of the reflected light in the optical measurement device 100 of the first embodiment. FIG. 9 is a flowchart illustrating a schematic operation of measuring the distance to the target TA in the optical measurement device 100 of the first embodiment.

When the threshold value setting is selected by, for example, an operation of the user, the control part 50 of the optical measurement device 100 executes a threshold value setting process S200 shown in FIG. 8.

<Threshold Value Setting Process>

First, the setting part 52 acquires the parameters input by the operation of the user (S201). Arbitrary numerical values are designated for the parameters by the user.

Next, the setting part 52 acquires the sensor head relative coefficient stored in the storage part 35 from the sensor head 30 (S202). Specifically, by connecting the storage part 35 in which the sensor head relative coefficient is stored to the input/output I/F 65 of the controller 90, the setting part 52 can read and acquire the sensor head relative coefficient from the storage part 35 via the input/output I/F 65.

Next, the setting part 52 accesses the storage part 60 and acquires the controller relative coefficient stored in the storage part 60 (S203).

Next, the setting part 52 sets the threshold value for the received light amount per unit time of the reflected light based on the parameters acquired in step S201, the sensor head relative coefficient acquired in step S202, and the controller relative coefficient acquired in step S203 (S204). The threshold value is, for example, a value acquired by multiplying all of the parameters, the sensor head relative coefficient, and the controller relative coefficient.

Next, the setting part 52 stores in the storage part 60 the threshold value for the received light amount per unit time of the reflected light set in step S204 (S205).

After step S205, the setting part 52 ends the threshold value setting process S200.

In this way, by setting the threshold value for the received light amount per unit time of the reflected light based on the sensor head relative coefficient, the controller relative coefficient, and the parameters, it is possible to set the threshold value according to the usage, application, and the like of the user while suppressing the influence of both the variation in the light amount of the light source 10 and the variation in the light amount of the collimator lens 31, the diffraction lens 32 and the objective lens 33.

Further, when the optical measurement device 100 is activated by, for example, an operation of the user, the control part 50 of the optical measurement device 100 executes a distance measurement process S250 shown in FIG. 9.

<Distance Measurement Process>

First, the control part 50 outputs a control signal at a predetermined cycle, and projects light from the light source 10 onto the target TA (S251).

Next, the control part 50 acquires the received light amount distribution signal of the reflected light reflected by the target TA from the light reception part 40 (S252).

Next, the determination part 53 calculates the received light amount per unit time of the reflected light based on the received light amount distribution signal acquired in step S252 (S253). Specifically, the determination part 53 divides the peak received light amount in the received light amount distribution signal by the exposure time to calculate the received light amount per unit time of the reflected light.

Next, the determination part 53 accesses the storage part 60, reads the threshold value, compares the threshold value with the received light amount per unit time of the reflected light calculated in step S253, and determines whether the received light amount per unit time of the reflected light is greater than or equal to the threshold value (S254).

Based on the determination in step S254, when the received light amount per unit time of the reflected light is greater than or equal to the threshold value, it is considered that there is no noise in the distance measured based on the received light amount of the reflected light. Therefore, the measurement part 51 measures the distance from the sensor head 30 of the optical measurement device 100 to the target TA based on the received light amount distribution signal acquired in step S252 (S255).

Next, the measurement part 51 causes the display part 80 to display the distance measured in step S255 (S256).

Based on the determination in step S254, when the received light amount per unit time of the reflected light is not greater than or equal to the threshold value, that is, when the received light amount per unit time of the reflected light is less than the threshold value, it is considered that there is noise in the measured distance based on the received light amount of the reflected light. Therefore, the measurement part 51 does not measure the distance from the sensor head 30 of the optical measurement device 100 to the target TA.

After step S256, or based on the determination in step S254, if the received light amount per unit time of the reflected light is less than the threshold value, the control part 50 returns to step S251 and repeats the processes from step S251 to step S256 until, for example, the optical measurement device 100 is stopped.

The embodiment shows an example in which the optical measurement device 100 measures the distance from the sensor head 30 to the target TA, but the disclosure is not limited thereto. The measured value measured by the optical measurement device may be based on the received light amount of the reflected light. The optical measurement device may, for example, measure a change in distance with respect to a certain position as a reference, that is, a displacement.

Further, the embodiment shows an example in which the optical measurement device 100 measures the distance by the white confocal method, but the disclosure is not limited thereto.

The optical measurement device may measure the distance by, for example, the triangular ranging method.

Further, the embodiment shows an example of setting the threshold value for the received light amount per unit time of the reflected light based on the relative coefficient of the optical measurement device 100, but the disclosure is not limited thereto. The threshold value may be set based on the feature information regarding the light amount of the optical measurement device, and may be set based on information other than the relative coefficient of the optical measurement device 100.

Second Embodiment

Figure 10:
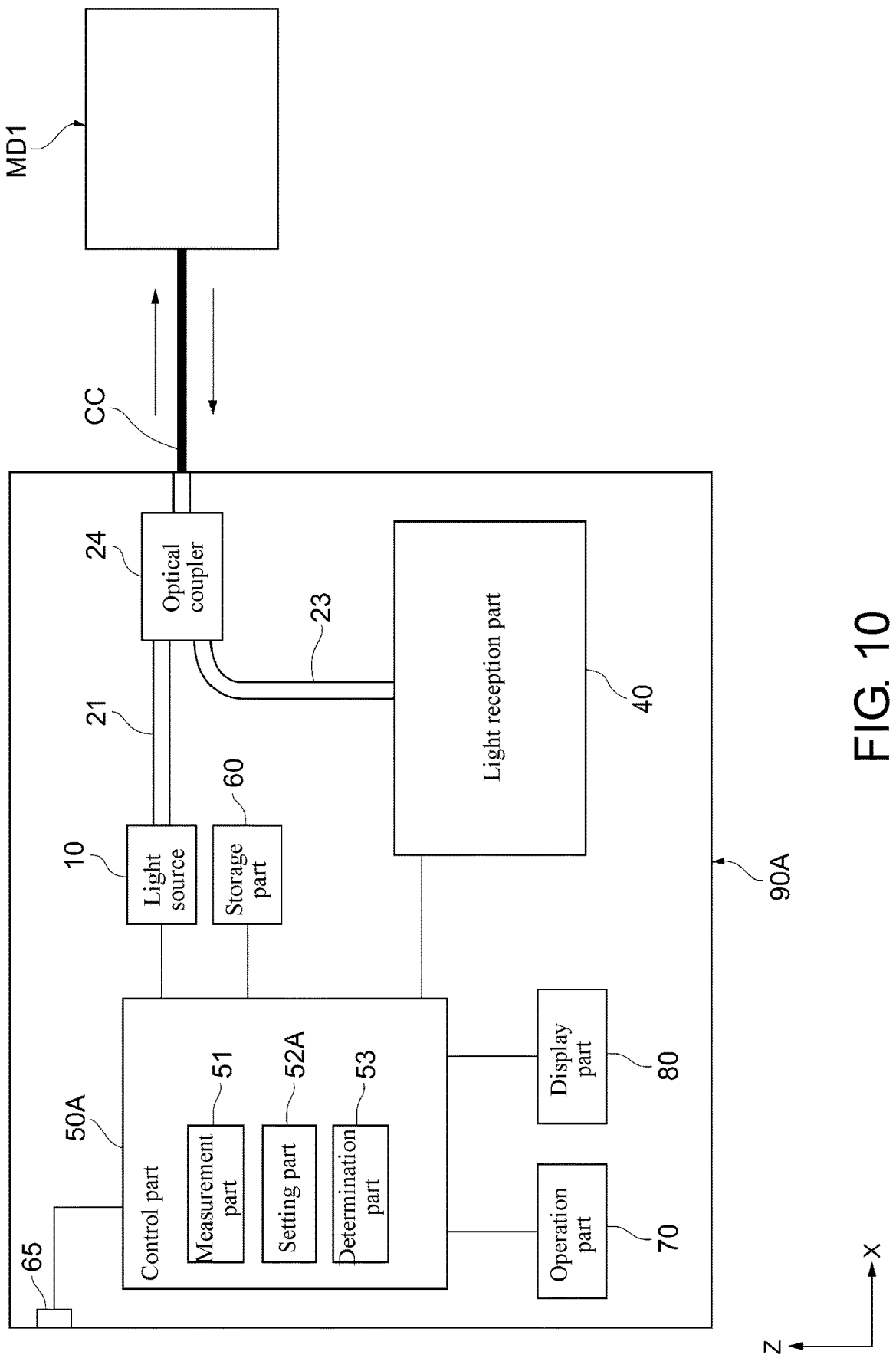
FIG. 10 is a configuration diagram illustrating a schematic configuration for acquiring a controller light amount feature value of the controller included in the optical measurement device according to the second embodiment.
Figure 11:
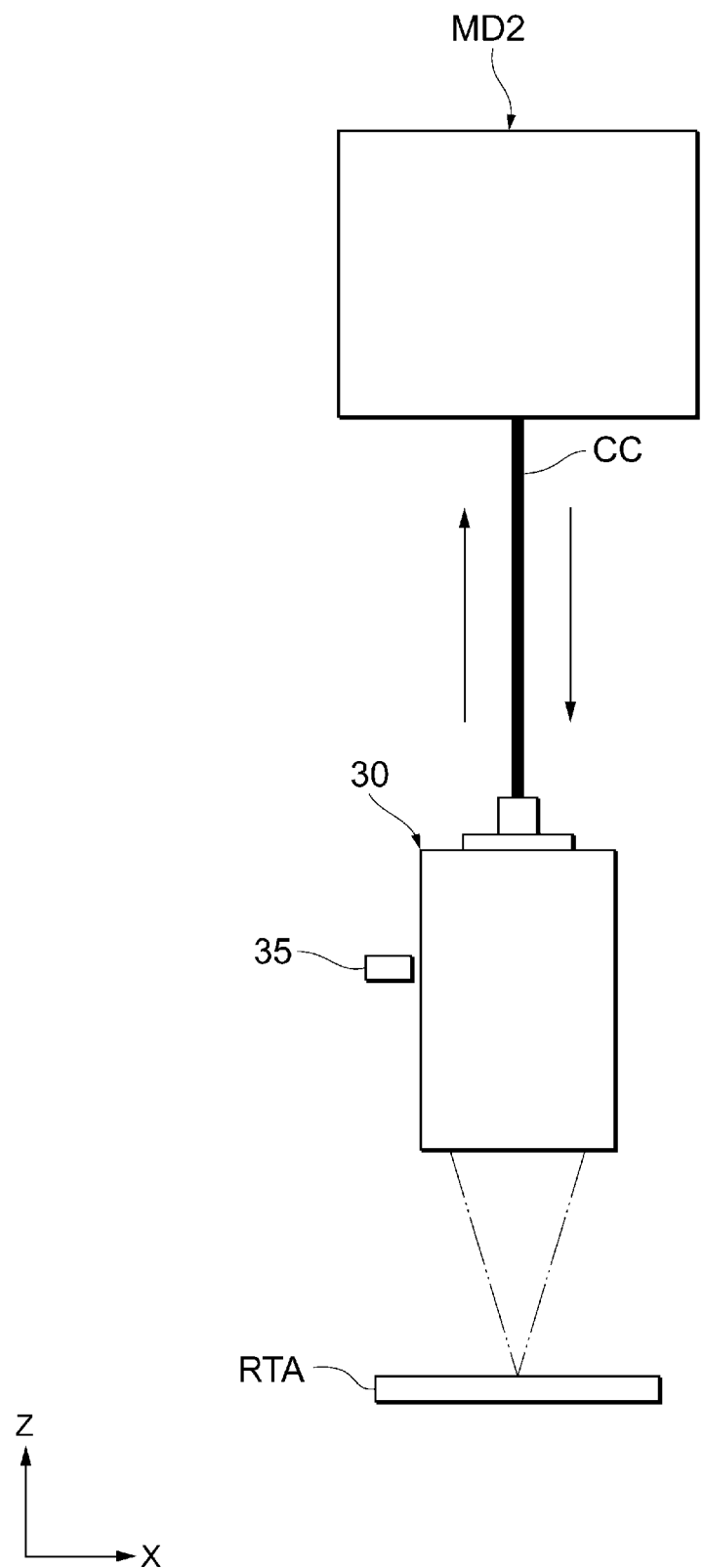
FIG. 11 is a configuration diagram illustrating a schematic configuration for acquiring a sensor head light amount feature value of the sensor head included in the optical measurement device according to the second embodiment.

Next, an optical measurement device according to the second embodiment of the disclosure will be described with reference to FIGS. 10 to 12. Further, the same or similar configurations as those in the first embodiment are denoted by the same or similar reference numerals. Hereinafter, the points different from the first embodiment will be described. In addition, the same actions and effects due to the same configurations will not be sequentially described.

First, a light amount feature value of the optical measurement device 100A according to the second embodiment of the disclosure will be described with reference to FIGS. 10 and 11. FIG. 10 is a configuration diagram illustrating a schematic configuration for acquiring a controller light amount feature value of the controller 90A included in the optical measurement device 100A according to the second embodiment. FIG. 11 is a configuration diagram illustrating a schematic configuration for acquiring a sensor head light amount feature value of the sensor head 30 included in the optical measurement device 100A according to the second embodiment.

The optical measurement device 100A of the second embodiment includes the controller 90A and the sensor head 30, and the controller 90A is different from the controller 90 of the first embodiment in that the control part 50A of the controller 90A includes the setting part 52A as its functional configuration.

The setting part 52A is configured to set the threshold value for the received light amount per unit time of the reflected light based on the light amount feature value of the optical measurement device 100A. The light amount feature value of the optical measurement device 100A corresponds to another example of the "feature information" of the disclosure. The light amount feature value of the optical measurement device 100A includes, for example, the controller light amount feature value and the sensor head light amount feature value, which will be described later.

First, among the light amount feature value of the optical measurement device 100A, the controller light amount feature value is acquired. The controller light amount feature value is determined, for example, in an inspection process of the controller 90A. As shown in FIG. 10, in the inspection process, the controller 90A is connected to a light amount measurement device MD1 by the connection cable CC. With the light amount measurement device MD1 connected, the controller 90A first emits light from the light source 10 via the first cable 21 and the optical coupler 24. The light amount of the light emitted from the controller 90A is measured by the light amount measurement device MD1 via the connection cable CC. The measured emitted light amount is stored in, for example, a memory (not shown) of the light amount measurement device MD1. The unit of the emitted light amount is, for example, [mW]. Here, the light emitted from the controller 90A is controlled so as to have a predetermined light amount. However, since the light amount varies in the output system from the light source 10 to the optical coupler 24 of the controller 90A, the light amount measured by the light amount measurement device MD1 is a value that reflects the variation in the light amount in the output system of the controller 90A.

Furthermore, the light amount measurement device MD1 emits light with a preset light amount and causes it to be incident on the controller 90A via the connection cable CC. The received light amount of the light incident on the controller 90A is detected by the light reception part 40 via the optical coupler and the third cable 23. The detected received light amount is stored in, for example, the storage part 60. The unit of the received light amount is, for example, the least significant bit ([LSB]). The LSB is a quantization unit for the received light amount of the optical measurement device 100A, and can have a value from 0 to 4095, for example. Here, the received light amount incident on the controller 90A should be the preset value. However, since the light amount varies in the input system from the optical coupler 24 to the light reception part 40 (more specifically, to the light reception sensor 44) of the controller 90A, the received light amount detected by the light reception part 40 is a value that reflects the variation in the light amount in the input system of the controller 90A.

After the emitted light amount is measured by the light amount measurement device MD1 and the received light amount is detected by the controller 90A, the controller 90A, for example, acquires the emitted light amount stored in the light amount measurement device MD1 via the input/output I/F 65. Then, the controller 90A calculates the light amount feature value of the controller 90A, that is, the controller light amount feature value, represented by the following equation (1) by using the acquired emitted light amount and the received light amount stored in the storage part 60.

Controller light amount feature value=emitted light amount x received light amount (1)

The calculated controller light amount feature value is stored in the storage part 60 of the controller 90A. Further, the controller light amount feature value corresponds to another example of the "first feature information" of the disclosure.

Next, among the light amount feature value of the optical measurement device 100A, the sensor head light amount feature value is acquired. The sensor head light amount feature value is determined, for example, in an inspection process of the sensor head 30. As shown in FIG. 11, in the inspection process, the sensor head 30 is connected to a light amount measurement device MD2 by the connection cable CC. With the light amount measurement device MD2 connected, the light amount measurement device MD2 emits light with a preset light amount and causes it to be incident on the sensor head 30 via the connection cable CC. The light incident on the sensor head 30 is irradiated from the sensor head 30 to the reference target RTA and reflected by the reference target RTA. The sensor head 30 condenses the reflected light and emits it, and causes the reflected light to be incident on the light amount measurement device MD2 via the connection cable CC. The light amount measurement device MD2 measures the light amount of the incident reflected light and stores it in a memory or the like (not shown). The unit of the reflected light amount is, for example, [mW]. Here, when the reference target RTA has a high reflectance, such as a mirror, the light amount of the reflected light emitted from the sensor head 30 should be the preset value. However, since the light amount varies in the optical system including the collimator lens 31, the diffraction lens 32, and the objective lens 33 of the sensor head 30, the reflected light amount measured by the light amount measurement device MD2 is a value that reflects the variation in the light amount in the optical system of the sensor head 30.

After the reflected light amount is measured by the light amount measurement device MD2, for example, the storage part 35 is connected to a connection terminal (not shown) of the light amount measurement device MD2. The light amount measurement device MD2 writes the stored reflected light amount to the storage part 35. The light amount feature value of the sensor head 30, that is, the sensor head light amount feature value, is represented by the following equation (2) by using the reflected light amount stored in the storage part 35.

$$\text{Sensor head light amount feature value} = \text{reflected light amount} \quad (2)$$

Further, the sensor head light amount feature value corresponds to another example of the "second feature information" of the disclosure.

Next, an example of the operation of the optical measurement device according to the second embodiment will be described with reference to FIG. 12. FIG. 12 is a flowchart illustrating a schematic operation of setting the threshold value for the received light amount per unit time of the reflected light in the optical measurement device 100A of the second embodiment.

Figure 12:
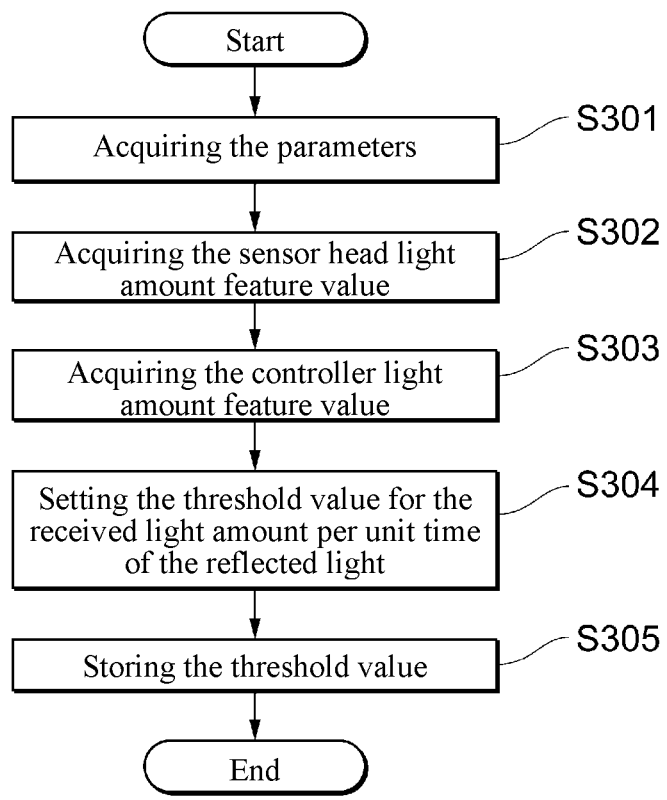
FIG. 12 is a flowchart illustrating a schematic operation of setting the threshold value for the received light amount per unit time of the reflected light in the optical measurement device of the second embodiment.

When the threshold value setting is selected by, for example, an operation of the user, the control part 50A of the optical measurement device 100A executes a threshold value setting process S300 shown in FIG. 12.

<Threshold Value Setting Process>

First, the setting part 52A acquires the parameters input by the operation of the user (S301). Arbitrary numerical values are designated for the parameters by the user.

Next, the setting part 52A acquires the sensor head light amount feature value stored in the storage part 35 from the sensor head 30 (S302). Specifically, by connecting the storage part 35 in which the sensor head light amount feature value is stored to the input/output I/F 65 of the controller 90A, the setting part 52A can read and acquire the sensor head light amount feature value from the storage part 35 via the input/output I/F 65.

Next, the setting part 52A accesses the storage part 60 and acquires the controller light amount feature value stored in the storage part 60 (S303).

Next, the setting part 52A sets the threshold value for the received light amount per unit time of the reflected light based on the parameters acquired in step S301, the sensor head light amount feature value acquired in step S302, and the controller light amount feature value acquired in step S303 (S304). Specifically, the threshold value is calculated by the following equation (3) by using the parameters, the sensor head light amount feature value, the controller light amount feature value, and a calculation coefficient stored in the storage part 60 in advance. Further, the calculation coefficient is for normalizing the controller light amount feature value and the sensor head light amount feature value, and the unit thereof is, for example, $[1/(\text{mW}^2 \times \text{LSB})]$.

$$\text{Threshold value} = \text{parameter} \times \text{controller light amount feature value} \times \text{sensor head light amount feature value} \times \text{calculation coefficient} \quad (3)$$

Next, the setting part 52A stores in the storage part 60 the threshold value for the received light amount per unit time of the reflected light set in step S304 (S305).

After step S305, the setting part 52A ends the threshold value setting process S300.

In this way, even when the threshold value for the received light amount per unit time of the reflected light is set based on the sensor head light amount feature value, the controller light amount feature value, and the parameters, as in the first embodiment, it is possible to set the threshold value according to the usage, application, and the like of the user while suppressing the influence of both the variation in the light amount of the light source 10 and the variation in the light amount of the collimator lens 31, the diffraction lens 32 and the objective lens 33.

The exemplary embodiments of the disclosure have been described above. According to the optical measurement device 100 and the optical measurement method according to an embodiment of the disclosure, the threshold value for the received light amount per unit time of the reflected light is set. Here, the inventors have found that the received light amount per unit time is less changed due to the measurement conditions than the received light amount, and is a substantially constant value for each target. Therefore, based on the threshold value for the received light amount per unit time of the reflected light, it is possible to determine the presence or absence of noise that may occur in the measured distance without setting the threshold value for each measurement condition. Further, the threshold value for the received light amount per unit time of the reflected light is set based on the feature information regarding the light amount of the optical measurement device 100. In this way, for example, the ideal received light amount per unit time of the reflected light is used as a reference value, and based on the relative coefficient of the optical measurement device 100 with respect to the reference value, it is possible to set the threshold value for the received light amount per unit time of the reflected light and to suppress the influence of variations in the light amount for each optical measurement device according to the variation in the light amount inherent in the optical measurement device 100. Therefore, it is possible to reduce the influence of the variation in the light amount inherent in the optical measurement device 100 in the determination of the presence or absence of noise in the measured distance.

The embodiments described above are for facilitating the understanding of the disclosure, and are not for limiting and interpreting the disclosure. Each element included in the embodiments and its disposition, material, condition, shape, size, and the like are not limited to those exemplified, and can be changed as appropriate. In addition, the configurations shown in different embodiments can be partially replaced or combined.

APPENDIX

1. An optical measurement device (100) that acquires a measured value based on a received light amount of reflected light reflected by a target (TA), the optical measurement device (100) including:
    a setting part (52) that sets a threshold value for a received light amount per unit time of the reflected light based on feature information regarding a light amount of the optical measurement device (100); and
    a determination part (53) that determines presence or absence of noise in the measured value based on the threshold value.

9. An optical measurement method using an optical measurement device (100) that acquires a measured value based on a received light amount of reflected light reflected by a target (TA), the optical measurement method comprising:
    a setting step of setting a threshold value for a received light amount per unit time of the reflected light based on feature information regarding a light amount of the optical measurement device (100); and
    a determination step of determining presence or absence of noise in the measured value based on the threshold value.

What is claimed is:

1. An optical measurement device that acquires a measured value based on a received light amount of reflected light reflected by a target, the optical measurement device comprising:
a setting part that sets a threshold value for a received light amount per unit time of the reflected light based on feature information regarding a light amount of the optical measurement device, the feature information comprising a relative coefficient of the optical measurement device with respect to a reference value;
a determination part that determines presence or absence of noise in the measured value based on the threshold value;
a controller that comprises a light source for emitting light; and
a sensor head that comprises an optical system for condensing the reflected light,
wherein the setting part sets the threshold value based on first feature information regarding a light amount of the controller and second feature information regarding a light amount of the sensor head, the first feature information comprises a controller relative coefficient with respect to the received light amount per unit time of the reflected light and the reference value, and the second feature information comprises a sensor head relative coefficient with respect to the received light amount per unit time of the reflected light and the reference value,
wherein the controller further comprises a first storage part for storing the first feature information, and
the sensor head further comprises a second storage part for storing the second feature information.

2. The optical measurement device according to claim 1, further comprising:
an input part for inputting a predetermined arbitrary parameter,
wherein the setting part sets the threshold value based on the first feature information, the second feature information, and the parameter.

3. The optical measurement device according to claim 1, further comprising a measurement part that is configured to measure a distance from the optical measurement device to the target based on the received light amount of the reflected light and output the distance as the measured value,
wherein when the determination part determines that there is noise in the distance, the measurement part is configured not to output the distance as the measured value.

4. The optical measurement device according to claim 3, wherein the light comprises a plurality of wavelength components,
the optical system causes chromatic aberration to occur along an optical axis direction for the light, irradiates the target with the light having the chromatic aberration, and condenses the reflected light, and
the optical measurement device further comprises a light reception part for detecting the received light amount of the reflected light and configured to be able to detect the received light amount for each of the wavelength components.

5. The optical measurement device according to claim 4, wherein the measurement part measures the distance based on a peak received light amount in a received light amount distribution of each of the wavelength components of the reflected light.

6. An optical measurement method using an optical measurement device that acquires a measured value based on a received light amount of reflected light reflected by a target, the optical measurement method comprising:
a setting step of setting a threshold value for a received light amount per unit time of the reflected light based on feature information regarding a light amount of the optical measurement device, the feature information comprising a relative coefficient of the optical measurement device with respect to a reference value; a determination step of determining presence or absence of noise in the measured value based on the threshold value,
wherein the optical measurement device comprises:
a controller that comprises a light source for emitting light; and
a sensor head that comprises an optical system for condensing the reflected light, and
the setting step comprises setting the threshold value based on first feature information regarding a light amount of the controller and second feature information regarding a light amount of the sensor head, wherein the first feature information comprises a controller relative coefficient with respect to the received light amount per unit time of the reflected light and the reference value, and the second feature information comprises a sensor head relative coefficient with respect to the received light amount per unit time of the reflected light and the reference value,
wherein the first feature information is stored in a first storage part of the controller, and
wherein the second feature information is stored in a second storage part of the sensor head.

7. The optical measurement method according to claim 6, further comprising a measurement step of measuring a distance from the optical measurement device to the target based on the received light amount of the reflected light and outputting the distances as the measured value,
wherein when the determination step determines that there is noise in the distance, the measurement step does not output the distance as the measured value.

8. The optical measurement method according to claim 7, wherein the light comprises a plurality of wavelength components, and
the optical measurement method further comprises:
a step of causing chromatic aberration to occur along an optical axis direction for the light, irradiating the target with the light having the chromatic aberration, and condensing the reflected light; and
a step of detecting the received light amount of the reflected light by a light reception part configured to be able to detect the received light amount for each of the wavelength components.

9. The optical measurement method according to claim 8, wherein the measurement step comprises measuring the distance based on a peak received light amount in a received light amount distribution of each of the wavelength components of the reflected light.

10. The optical measurement method according to claim 6, further comprising:
an input step for inputting a predetermined arbitrary parameter,
wherein the setting step comprises setting the threshold value based on the first feature information, the second feature information, and the parameter.

* * * * *